(12) United States Patent
Ignatyev

(10) Patent No.: US 10,659,542 B2
(45) Date of Patent: May 19, 2020

(54) SYSTEM AND METHODS FOR OPTIMAL ALLOCATION OF MULTI-TENANT PLATFORM INFRASTRUCTURE RESOURCES

(71) Applicant: NETSUITE INC., San Mateo, CA (US)

(72) Inventor: Oleksiy Ignatyev, Belmont, CA (US)

(73) Assignee: NETSUITE INC., San Mateo, CA (US)

( * ) Notice: Subject to any disclaimer, the term of this patent is extended or adjusted under 35 U.S.C. 154(b) by 451 days.

(21) Appl. No.: 15/417,564

(22) Filed: Jan. 27, 2017

(65) Prior Publication Data

US 2017/0318083 A1     Nov. 2, 2017

Related U.S. Application Data

(60) Provisional application No. 62/328,145, filed on Apr. 27, 2016, provisional application No. 62/406,269, filed on Oct. 10, 2016.

(51) Int. Cl.
*H04L 29/08* (2006.01)
*H04L 12/26* (2006.01)

(52) U.S. Cl.
CPC .......... *H04L 67/22* (2013.01); *H04L 43/0876* (2013.01); *H04L 67/1023* (2013.01); *H04L 67/306* (2013.01)

(58) Field of Classification Search
CPC ....... H04L 67/22; H04L 67/306; H04L 43/08; H04L 43/0817
See application file for complete search history.

(56) References Cited

U.S. PATENT DOCUMENTS

| | | | |
|---|---|---|---|
| 6,996,615 B1* | 2/2006 | McGuire | G06F 9/505 709/224 |
| 8,478,782 B1 | 7/2013 | Kuruganti et al. | |
| 8,560,571 B1 | 10/2013 | Lai et al. | |
| 8,706,772 B2 | 4/2014 | Hartig et al. | |
| 8,868,605 B2 | 10/2014 | Kuruganti et al. | |
| 9,733,921 B1 | 8/2017 | Saenz et al. | |
| 2010/0049570 A1* | 2/2010 | Li | G06Q 10/06 718/104 |
| 2012/0324073 A1* | 12/2012 | Dow | G06F 9/06 709/223 |
| 2014/0019415 A1* | 1/2014 | Barker | G06F 16/214 707/643 |
| 2014/0082165 A1* | 3/2014 | Marr | G06F 9/5044 709/222 |
| 2017/0072568 A1* | 3/2017 | Hitchcock | G06Q 30/0645 |

FOREIGN PATENT DOCUMENTS

WO    WO-2013152216 A1 * 10/2013    ........... G06F 9/5088

* cited by examiner

*Primary Examiner* — Jason D Recek
*Assistant Examiner* — Lesa M Kennedy
(74) *Attorney, Agent, or Firm* — Kraguljac Law Group, LLC

(57) ABSTRACT

A system and associated processes to enable a multi-tenant platform operator or administrator to make more optimal decisions with regards to the allocation of platform infrastructure resources (such as computational capabilities, data storage, etc.) among one or more tenants or accounts. In some embodiments, the inventive methods construct a data "signature" for a set of identified users, accounts, or tenants, where the signature contains data regarding the user, account, or tenant's "consumption" of platform infrastructure resources.

17 Claims, 10 Drawing Sheets

|        | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 |
|--------|----|----|----|----|----|----|----|----|----|----|----|----|----|----|----|----|----|----|----|----|----|----|----|----|
| Ten1   | 1  | 1  | 1  | 1  | 2  | 5  | 10 | 15 | 25 | 30 | 35 | 35 | 35 | 30 | 30 | 25 | 25 | 25 | 20 | 20 | 20 | 5  | 1  | 1  |
| Ten2   | 2  | 2  | 1  | 1  | 2  | 6  | 8  | 10 | 20 | 25 | 35 | 35 | 35 | 35 | 30 | 25 | 25 | 25 | 25 | 20 | 10 | 5  | 2  | 2  |
| Ten3   | 1  | 1  | 2  | 2  | 2  | 5  | 9  | 14 | 22 | 28 | 30 | 35 | 35 | 35 | 35 | 30 | 25 | 25 | 25 | 22 | 8  | 4  | 2  | 1  |
| Ten4   | 1  | 1  | 1  | 2  | 3  | 5  | 25 | 15 | 25 | 30 | 35 | 30 | 35 | 30 | 30 | 25 | 25 | 25 | 20 | 15 | 10 | 5  | 2  | 1  |
| Ten5   | 30 | 35 | 35 | 35 | 30 | 20 | 25 | 25 | 20 | 20 | 20 | 10 | 5  | 1  | 1  | 1  | 1  | 1  | 1  | 2  | 5  | 10 | 15 | 25 |
| Ten6   | 25 | 30 | 35 | 35 | 35 | 30 | 30 | 25 | 25 | 25 | 20 | 8  | 5  | 2  | 2  | 2  | 2  | 2  | 2  | 2  | 6  | 8  | 16 | 20 |
| Ten7   | 28 | 30 | 30 | 35 | 35 | 35 | 30 | 25 | 22 | 28 | 22 | 10 | 4  | 2  | 1  | 1  | 1  | 2  | 2  | 2  | 5  | 8  | 14 | 22 |
| Ten8   | 30 | 35 | 35 | 35 | 30 | 30 | 25 | 25 | 25 | 30 | 15 | 5  | 5  | 5  | 1  | 1  | 1  | 1  | 2  | 3  | 5  | 9  | 15 | 20 |
| Ten9   | 25 | 25 | 25 | 20 | 10 | 5  | 1  | 2  | 1  | 1  | 1  | 2  | 2  | 2  | 2  | 2  | 1  | 2  | 2  | 2  | 5  | 8  | 16 | 20 |
| Ten10  | 35 | 25 | 25 | 20 | 8  | 4  | 2  | 1  | 2  | 2  | 2  | 2  | 2  | 5  | 8  | 10 | 20 | 25 | 30 | 35 | 35 | 35 | 30 | 25 |
| Ten11  | 35 | 25 | 25 | 22 | 10 | 4  | 2  | 1  | 1  | 1  | 2  | 2  | 2  | 6  | 8  | 11 | 22 | 28 | 30 | 35 | 35 | 35 | 35 | 30 |
| Ten12  | 25 | 25 | 20 | 15 | 10 | 5  | 2  | 1  | 1  | 1  | 2  | 2  | 3  | 5  | 9  | 15 | 20 | 30 | 35 | 35 | 35 | 30 | 30 | 25 |

Figure 5(a)

| Tenant | 1 | 2 | 3 | 4 | 5 | 6 | 7 | 8 | 9 | 10 | 11 | 12 |
|---|---|---|---|---|---|---|---|---|---|---|---|---|
| Tenant1 | 20 | 15 | 17 | 18 | 15 | 14 | 16 | 15 | 20 | 20 | 50 | 45 |
| Tenant2 | 22 | 18 | 16 | 19 | 18 | 18 | 20 | 18 | 19 | 21 | 47 | 48 |
| Tenant3 | 18 | 17 | 17 | 20 | 20 | 22 | 19 | 20 | 22 | 22 | 48 | 50 |
| Tenant4 | 15 | 15 | 47 | 16 | 18 | 17 | 20 | 18 | 20 | 48 | 15 | 20 |
| Tenant5 | 17 | 15 | 50 | 19 | 16 | 20 | 20 | 16 | 24 | 47 | 17 | 21 |
| Tenant6 | 20 | 19 | 45 | 19 | 18 | 19 | 21 | 19 | 20 | 45 | 17 | 20 |

Figure 5(b)

| Tenant | Vertical | Geographical zone | Number of employees | Number of licenses purchased | Estimated number of transactions/day | Number of software modules purchased | Number of items for sale in product catalog | Signature vectors |
|---|---|---|---|---|---|---|---|---|
| Tenant1 | e-commerce | USA | 235 | 15 | 5000 | 6 | 800 | Vector1 |
| Tenant2 | software | USA | 425 | 40 | N/A | 3 | N/A | Vector2 |
| Tenant3 | retail | Asia | 650 | 30 | 10000 | 7 | 3000 | Vector3 |
| Tenant4 | e-commerce | Europe | 150 | 10 | 2000 | 5 | 500 | Vector4 |

Figure 5(c)

| Tenant | Vertical | Geographical zone | Number of employees | Number of licenses purchased | Estimated number of transactions/day | Number of software modules purchased | Number of items for sale in product catalog | Signature vectors |
|---|---|---|---|---|---|---|---|---|
| Tenant5 | e-commerce | USA | 145 | 20 | 4500 | 4 | 500 | unknown |
| Tenant6 | manufacturing | Asia | 750 | 15 | N/A | 6 | N/A | unknown |
| Tenant7 | WD | USA | 300 | 12 | 500 | 5 | 4000 | unknown |
| Tenant8 | e-commerce | Europe | 450 | 50 | 3000 | 7 | 1000 | unknown |

Figure 5(d)

| Tenant | Vertical | Geographical zone | Number of employees | Number of licenses purchased | Estimated number of transactions/day | Number of software modules purchased | Number of items for sale in product catalog | Signature vectors |
|---|---|---|---|---|---|---|---|---|
| Tenant1 | e-commerce | USA | 235 | 15 | 5000 | 6 | 800 | Vector1 |
| Tenant12 | e-commerce | USA | 300 | 27 | 4000 | 6 | 1200 | Vector12 |
| Tenant20 | e-commerce | USA | 150 | 12 | 3000 | 7 | 100 | Vector20 |
| Tenant34 | e-commerce | USA | 500 | 35 | 10000 | 6 | 300 | Vector34 |

Figure 5(e)

SYSTEM AND METHODS FOR OPTIMAL ALLOCATION OF MULTI-TENANT PLATFORM INFRASTRUCTURE RESOURCES

CROSS REFERENCE TO RELATED APPLICATIONS

This application claims the benefit of U.S. Provisional Application No. 62/328,145, entitled "System and Methods for Optimal Allocation of Multi-Tenant Platform Infrastructure Resources," filed Apr. 27, 2016, which is incorporated by reference herein in its entirety (including the Appendix) for all purposes. This application also claims the benefit of U.S. Provisional Application No. 62/406,269, entitled "System and Methods for Optimizing Allocation of Resources in a Multi-Tenant Environment," filed Oct. 10, 2016, which is incorporated by reference herein in its entirety (including the Appendix) for all purposes.

BACKGROUND

A multi-tenant architecture provides a means for multiple accounts (tenants) and users to store and access their data, and to utilize specific applications that reside on a remote platform. The platform is typically implemented as a set of servers or server groups, and is administered and operated by another party that provides use of the platform infrastructure as a service to the accounts and each account's users. This service may provide data storage, computational processing power, data analytics, and applications or workflows that may be executed with reference to an account's data (in whole or in part, and account-wide or user-specific). In some cases, such services have been described as Software-as-a-Service (SaaS), cloud-based services, web-services, or remote services.

The applications that reside on a platform may be used to process certain of a user's data by instantiating an occurrence of the application within the user's account; for these types of uses, the applications may include ones utilized to operate a business, such as ERP, CRM, HR (HCM), eCommerce, and financial applications. Tenant customizations to the operation of the architecture may include custom functionality (such as the capability to perform tenant or user-specific functions, workflows, data processing, or operations) built on top of lower level operating system functions.

Some multi-tenant service platforms may offer the ability to customize functions or operations at several different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

In other cases, the applications may be ones used by a platform operator or administrator to manage the platform's operation, such as by managing the allocation of the resources available to the platform users. In this use case, the applications may be used to monitor events within a set of the users of an account, to manage an aspect of an account or set of accounts, or to determine metrics relating to the events initiated by a user, a set of users, an account, or a set of accounts, etc. In such cases, the resources being allocated and re-allocated may include access to computational data processing capabilities, data storage capacity, pre-processing/optimization techniques, etc., and may be distributed among multiple sources (servers, server groups, data storage elements, etc.).

Platform operators and administrators need to be able to alter how platform resources are allocated to (and used by) each account or a set of accounts in order to ensure optimal use of the resources, respond to system operational problems, or to execute a business plan involving segmented levels/qualities of service. Embodiments of the inventive system and methods are directed to providing ways to characterize resource usage data by account or tenant, and to process that data to enable platform operators and administrators to make more optimal decisions regarding allocation or allocation changes for platform infrastructure resources. Such decisions may involve placement of a new tenant or set of users' accounts on a specific server or server group, reallocation of one or more accounts, tenants, or users to a specific server or server group, or adjusting constraints or conditions on a tenant's or a set of users' access to certain platform resources.

Embodiments of the inventive system and methods are directed to overcoming the limitations associated with conventional approaches to providing these management capabilities, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention provide a mechanism for a multi-tenant platform operator or administrator to make more optimal decisions with regards to the allocation of platform infrastructure resources (such as computational capabilities, data storage, etc.) among one or more tenants or accounts. In some embodiments, the inventive methods construct a data "signature" for a set of identified users, accounts, or tenants, where the signature contains data regarding the user, account, or tenant's "consumption" of platform infrastructure resources. This consumption may be expressed in terms of any suitable metric, such as a value or number that represents the number or relative number of events that the user, account, or tenant has initiated within a specified time frame, the number of CPU cycles utilized by the user, account, or tenant during a specific time interval, or the maximum amount of data storage utilized within a specified time frame, with the origin of the time frame(s) involved being synchronized for all users, regardless of location and local time zone.

In some embodiments, each hour in a day may be represented as a "cell"/unit or dimension of data within a multi-dimensional vector that represents the user's consumption of one or more platform infrastructure resources within a day, for example. Such "signature" vectors for one user or account/tenant may be subjected to appropriate data processing (including, but not limited to, or required to include machine learning, statistical analysis, pattern matching, etc.) to identify usage metrics or trends in such metrics among users of an account or tenant.

Similarly, signature vectors for multiple users, accounts or tenants may be subjected to appropriate data processing in aggregate (including, but not limited to, or required to include machine learning, statistical analysis, pattern matching, etc.) to identify broader usage metrics and investigate larger scale resource demands over time, between locations, within industries, across verticals, etc.

In one embodiment, the invention is directed to a method for managing data processing platform resources for users of a multi-tenant platform, where the method includes:

accessing data regarding the usage of a platform resource as a function of time for a plurality of tenants of the multi-tenant platform;

for each of the plurality of tenants, constructing a platform resource usage data record, the data record including a measure of the platform resource usage during each of a plurality of time intervals;

selecting a fitness metric for each of a plurality of servers, wherein the fitness metric is a function of the platform resource usage for each tenant assigned to a server;

for each of the plurality of servers,
(a) determining an initial distribution of one or more of the plurality of tenants to one of the plurality of servers;
(b) based on the fitness metric, determining a first server of the plurality of servers having a value of the fitness metric that indicates that the set of tenants assigned to the first server should be modified;
(c) selecting a tenant currently assigned to the first server;
(d) selecting a second server to which the selected tenant may be moved;
(e) determining the value of the fitness metric for the second server after the selected tenant has been assigned to the second server;
(f) determining if the value of the fitness metric for the second server after the selected tenant has been assigned to the second server is less than the value of the fitness metric for the first server before the selected tenant is assigned to the second server;
(g) if the value of the fitness metric for the second server after the selected tenant has been assigned to the second server is less than the value of the fitness metric for the first server before the selected tenant is assigned to the second server, then assigning the selected tenant to the second server; and
(h) repeating steps (a) through (g) for one or more other servers, using the distribution of tenants resulting from assigning the selected tenant to the second server as the initial distribution for step (a).

In another embodiment, the invention is directed to a method of assigning a new tenant to a server being used to provide the tenant with business data processing services as part of a multi-tenant platform, where the method includes:

access data regarding the usage of a platform resource as a function of time for a plurality of current tenants of the multi-tenant platform;

for each of the plurality of current tenants, construct a platform resource usage data record, the data record including a measure of the platform resource usage during each of a plurality of time intervals;

determine one or more tenant characteristics that are correlated with a current tenant's resource usage;

determine a current tenant or set of tenants having the one or more tenant characteristics that are the same as those of the new tenant;

generate a platform resource usage data record for the new tenant based on the platform resource usage data record for the current tenant or set of tenants;

select a fitness metric for each of a plurality of servers, wherein the fitness metric is a function of the platform resource usage for each tenant assigned to a server;

for each of the plurality of servers,
(a) determine an initial distribution of one or more of the plurality of tenants to one of the plurality of servers;
(b) select the new tenant for assignment to a server;
(c) determine the value of the fitness metric for the server after the selected tenant has been assigned to the server;
(d) determine if the value of the fitness metric for the server after the selected tenant has been assigned to the server is less than the value of the fitness metric for the server; and
(e) if the value of the fitness metric for the server after the selected tenant has been assigned to the server is less than the value of the fitness metric for the server, then assign the selected tenant to the server.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIG. 4(a) represents certain of the data flow and data processing, while FIG. 4(b) is a graph illustrating the demand placed upon the infrastructure resources over time for a specific tenant or account;

FIGS. 5(a), 5(b), 5(c), 5(d), and 5(e) are Tables representing examples of the signatures that may be generated for a user or account based on the resource usage of the user or account, and in some cases, after application of one or more filters, rules, or conditions to the data;

Note that the same numbers are used throughout the disclosure and figures to reference like components and features.

DETAILED DESCRIPTION

Figure 1:
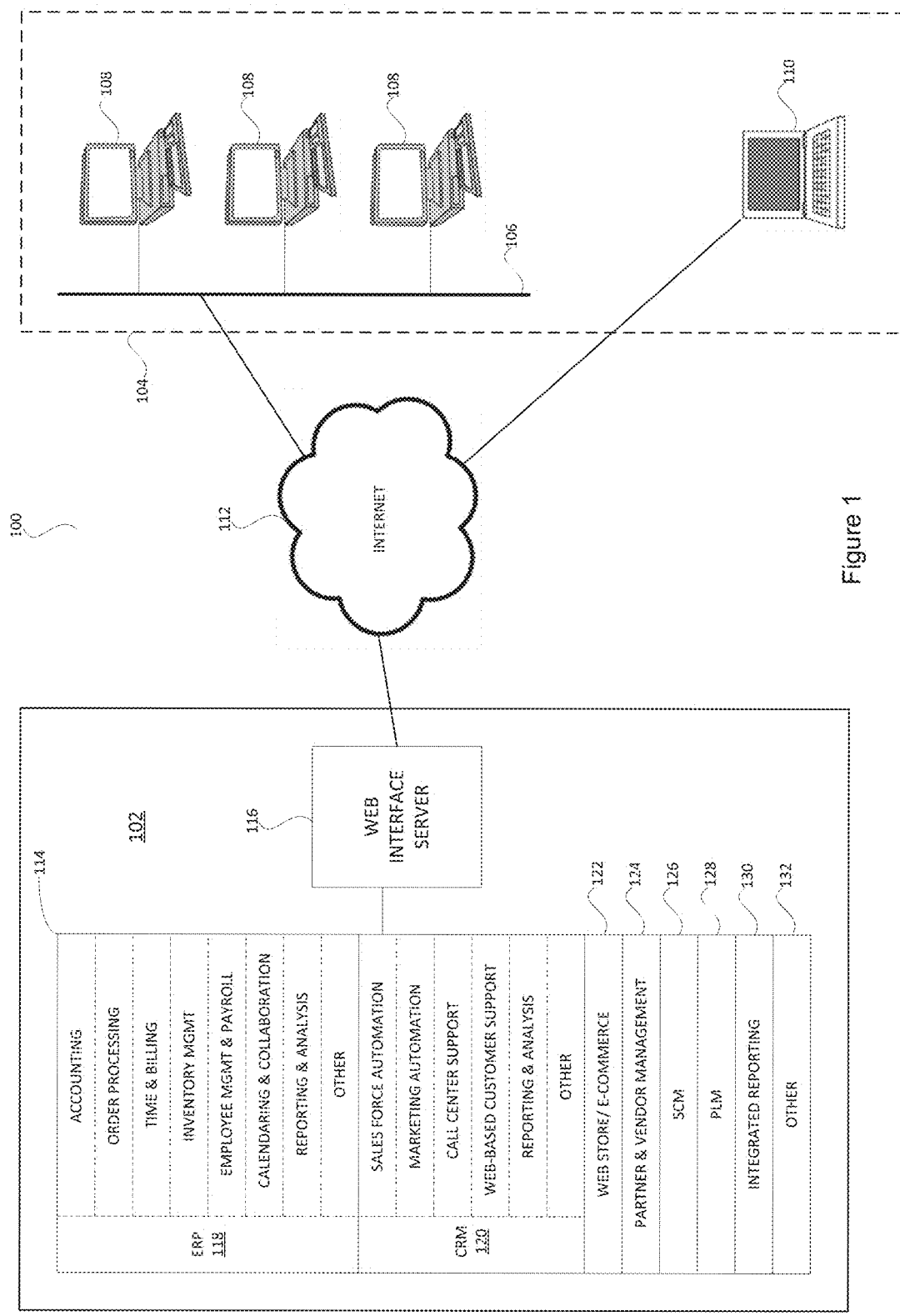
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention provide a mechanism for a multi-tenant platform operator or administrator to make more optimal decisions with regards to the allocation of platform infrastructure resources (e.g., computational capabilities, data storage, usage of an extension to a platform application, access to a restricted feature, etc.) among one or more tenants or accounts. In some embodiments, the inventive methods construct a data "signature" for a set of identified users, accounts, or tenants, where the signature contains data regarding the user, account, or tenant's "consumption" or utilization of one or more platform infrastructure resources. This consumption may be expressed as a value or number that represents one or more of the number or relative number of events that the user, account, or tenant has initiated within a specified time interval, the number of CPU cycles utilized by the user, account, or tenant during a specific time interval, or the maximum amount of data storage utilized within a specified time interval, with the origin of the time frame(s)/intervals involved being synchronized for all users, regardless of location and local time zone.

Although an embodiment of the inventive system and methods may be used to assist in making infrastructure resource allocation decisions in a variety of operating environments, it is particularly applicable for use as part of managing or operating a multi-tenant platform. One reason for this is that such a platform provides services to a relatively large number of separate accounts or clients, and each account may have its own associated resource usage characteristics, agreed upon quality-of-service (QoS) to be provided, short or longer-term spikes in resource demand, etc. This may make it more difficult for a platform manager or operator to identify and respond to trends or factors that influence infrastructure resource demand as the number of accounts and the number of users within those accounts increases. Note that although an example environment in which an embodiment of the inventive system and methods is that of a multi-tenant platform used to deliver Software-as-a-Service (SaaS), other computing or data processing architectures may also benefit by using an embodiment of the invention (such as client-server architectures with a large number of client users).

As noted, in some embodiments, the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 1-3. As noted, embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high-level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology.

Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management (HR or HCM), and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 2:
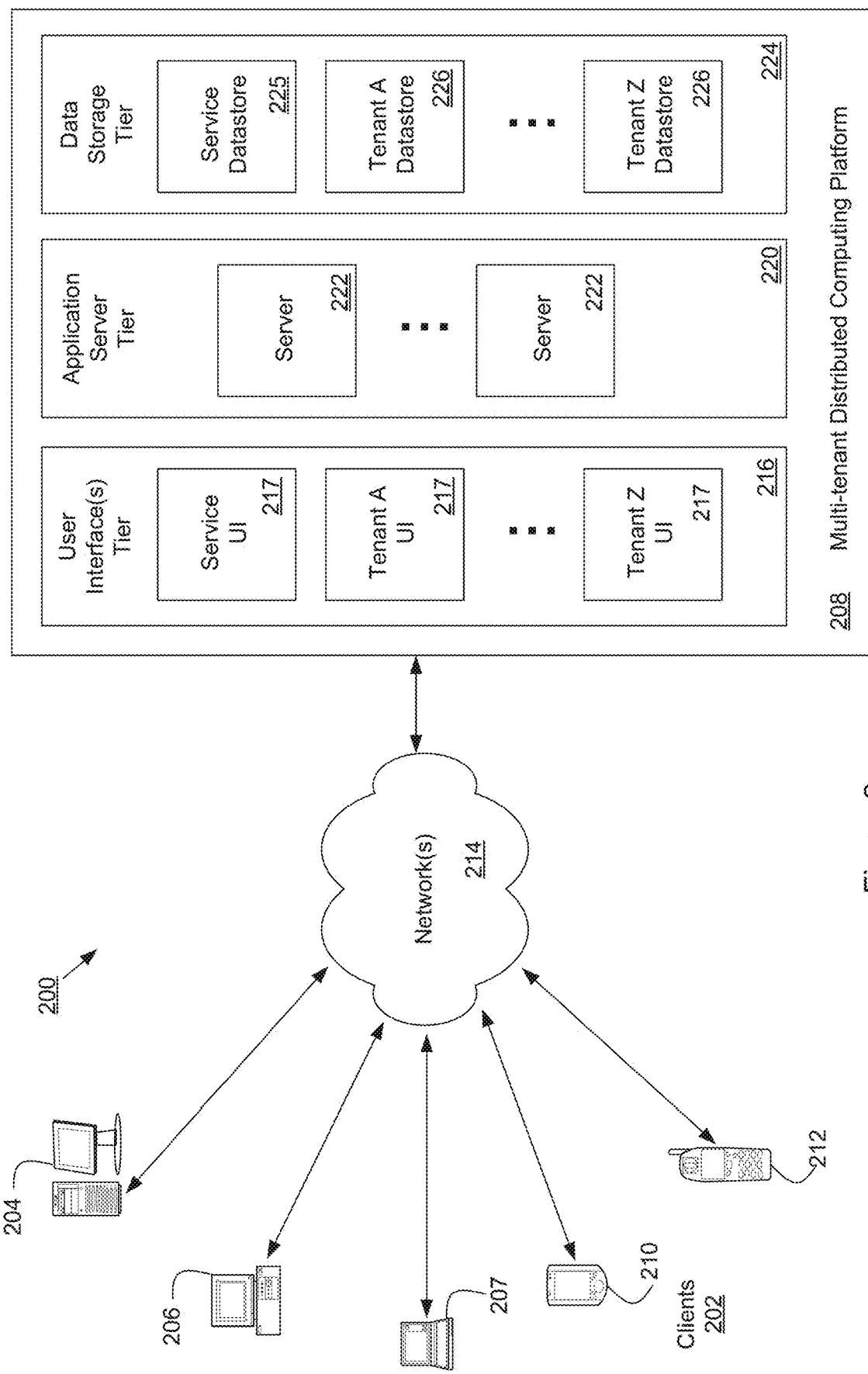
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained by using an integrated business system comprising ERP, CRM, and other business capabilities, as for example where the integrated business system is integrated with a merchant's eCommerce platform and/or "webstore." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system (e.g., its user interfaces, applications, or workflow) to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a third-party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer (or in some cases, an operator of the platform) may create an extension to an application that is available to users through a multi-tenant data processing platform. The extension may add new functionality or capabilities to the underlying application. One or more tenants/users of the platform may wish to add the extension to the underlying application to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) to obtain feedback for improving the newer version of the extension, to test the stability of the extension, or to assist them to segment the market for their extension(s).

Figure 3:
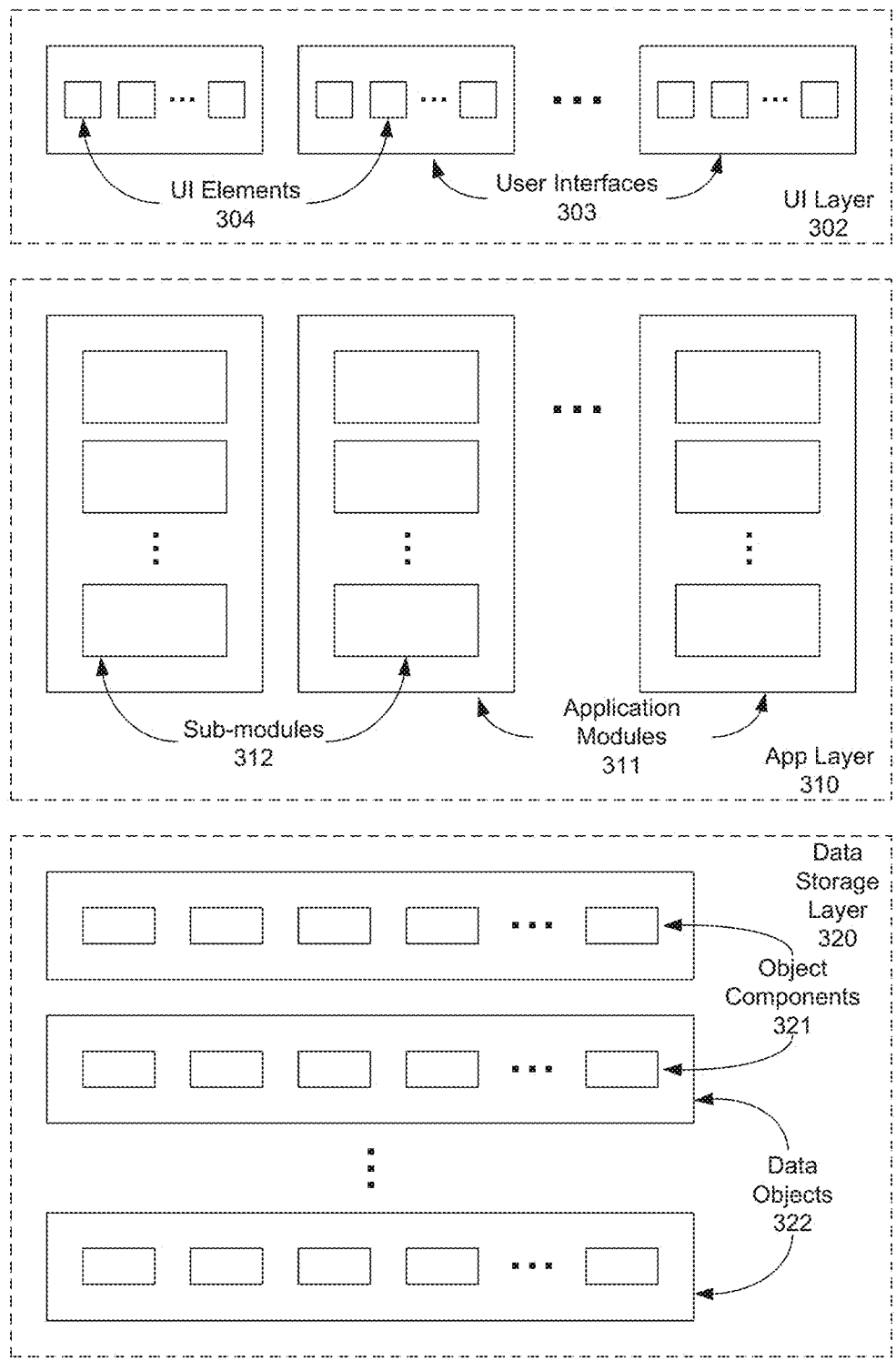
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system, such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or another functionality to a user of the platform). Such function, method, process, or operation may also include those used to implement one or more aspects of the inventive system and methods, such as for:

accessing data that may be used to characterize the resource(s) used by a user, account or tenant, or by a group of users, set of accounts, etc., where the resource(s) may include one or more of
    computational data processing resources;
    data storage capacity;

database file structures or data schemas;
optimization, data pre-processing, or data filtering processes;
specified extensions or value-add capabilities to the functionality of a data processing platform, a specific application or an account;
computing, constructing or deriving a relevant "signature" for each user or account, or for each set of users, or for a set of accounts, etc.;
implementing a decision process to determine an optimal or more optimal allocation of users, accounts or tenants to one or more resources (or an optimal or more optimal allocation of one or more resources to a user, account, set of accounts, etc.), where the decision process may depend upon one or more of
  a status of the resources being used by the user, account, or tenant, or by an aggregate set of the same (where the status may be expressed relative to a maximum capacity, relative to a desired operating level, etc.);
  a current or expected demand for a resource or resources by the user, account, or tenant (based, for example, on a value of certain parameters related to the operational status of a business or organization of which the user is a part, such as inventory, revenue, inventory velocity, sales, number of employees, expansion planning, project planning, etc.);
  an agreed upon level or quality of service (QoS) to be provided to the user, account, or tenant by the platform operator;
  a status or expected status of the platform as a whole with regards to resource demand, load balancing, or another platform operational metric; and
implementing a decision process to perform one or more of (a) assignment of an account (i.e., a tenant) or set of accounts to a server, (b) current or future planning of infrastructure requirements (based on current or expected demand and tenant or user levels), (c) modeling of possible allocation scenarios and their sensitivity to changes in the number or resource usage of tenants or users.

Note that by accessing and processing data regarding resource usage and possible demand (such as indicators of possible demand based on machine learning or other data processing techniques) across multiple tenants, embodiments of the inventive system and methods may be able to better allocate resources or "predict" potential resource demand across an industry or set of tenants, with this capability being possible in real-time or near real-time.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

As noted, the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include those having devices (including mobile devices), software applications, systems, apparatuses, networks, or other configurable components that may be used by multiple users for data entry, data processing, application execution, data review, etc. and which have user interfaces or user interface components that can be configured to present an interface to a user.

Although further examples below may reference the example computing environment depicted in FIGS. 1-3, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

Figure 4A:
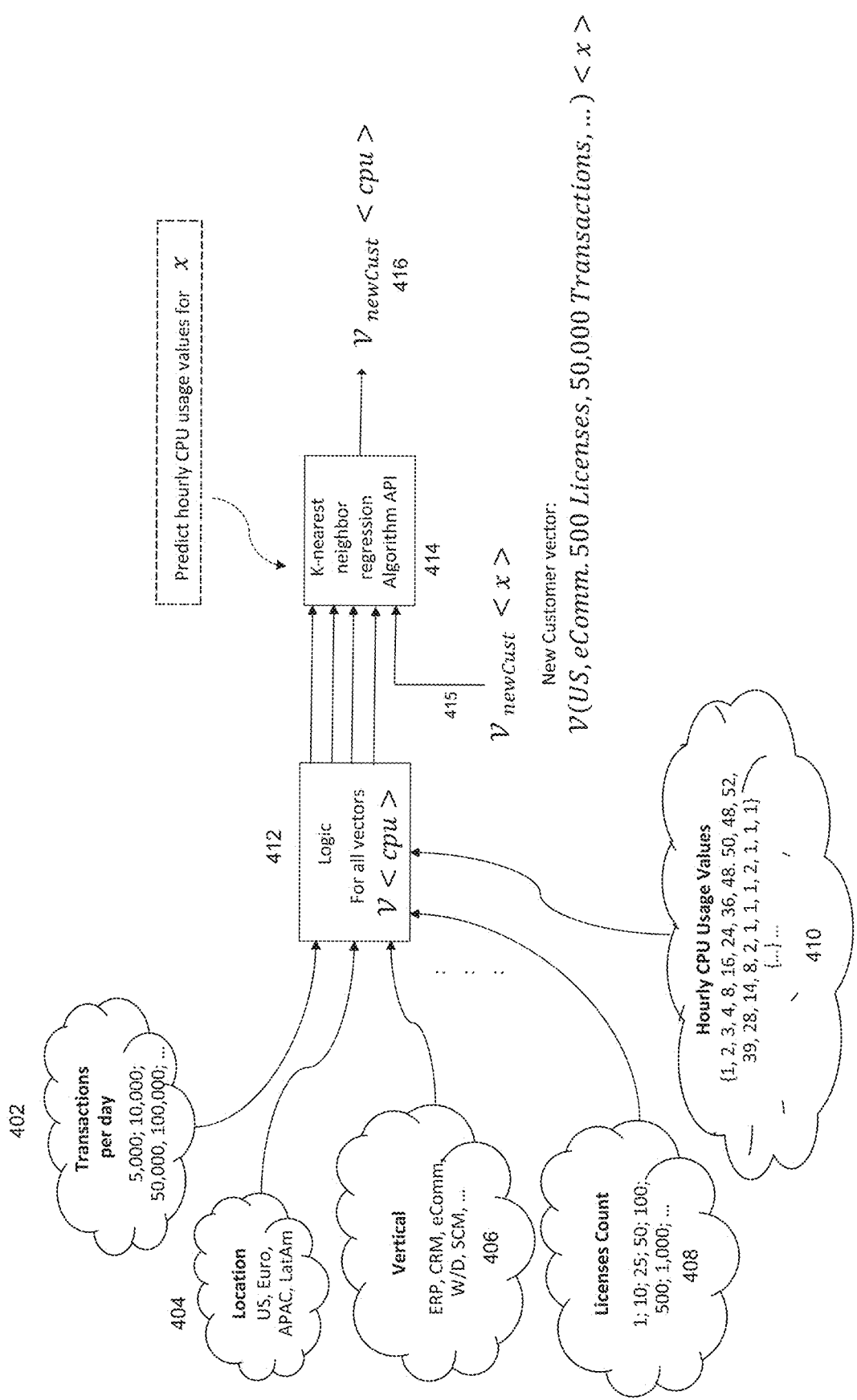
FIGS. 4(a) and 4(b) are diagrams illustrating aspects of the implementation of an embodiment of the inventive system and methods.
Figure 4B:
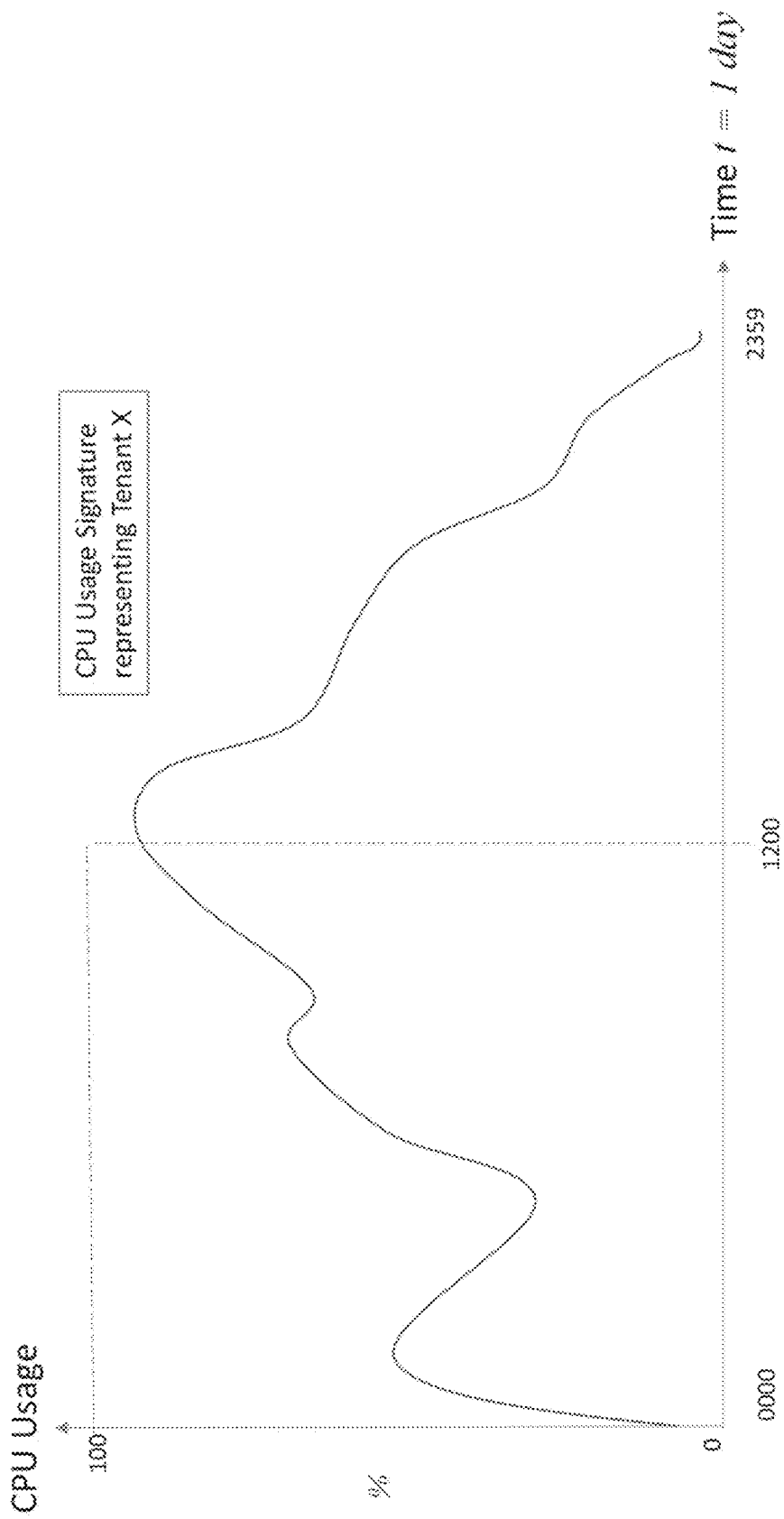

FIGS. 4(*a*) and 4(*b*) are diagrams illustrating aspects of the implementation of an embodiment of the inventive system and methods; FIG. 4(*a*) represents certain of the data flow and data processing, while FIG. 4(*b*) is a graph illustrating the demand placed upon the infrastructure resources over time for a specific tenant or account. FIGS. 5(*a*), 5(*b*), 5(*c*), 5(*d*), and 5(*e*) are Tables representing examples of the signatures that may be generated for a user or account based on the resource usage of the user or account, and in some cases, after application of one or more filters, rules, or conditions to the data. The processes illustrated in the figures and the results illustrated in the Tables will be described in greater detail in the following sections.

Embodiments of the inventive system and methods provide methods and tools for better understanding the usage of aspects of a cloud-based platform infrastructure by each tenant/account on a daily, weekly, monthly, annually or another basis. This is accomplished in part by creating a dashboard for the display of certain usage data for multiple tenants of the platform. This information can be used by an infrastructure management team to better (i.e., more optimally) distribute the different tenants/accounts among a plurality of servers and/or other infrastructure elements of the platform. This type of resource allocation methodology is expected to improve the performance of the platform software in each server of the cloud, and help to optimize allocation of the financial and support resources provided by the platform operator/administrator.

Note that these capabilities are enabled (at least in part) by the definition of the relevant signature(s), the capture of data used to represent the signature(s), the processing of the signature(s) (either for a single tenant, a group of tenants assigned or potentially assigned to a server, or across a set of tenants that are selected as being part of a specific category or industry), followed by the execution of a decision process that may be based on one or more rules or criteria. In some instances, the decision process may itself be a function of (or otherwise dependent upon) data related to the operational status of a business, company, or merchant that is represented by an account or tenant (such as by a level of transactions, revenue, sales, sales velocity, marketing expenditures, number of employees, expansion plans, etc.).

FIG. 4(a) illustrates certain of the data flow and data processing operations that may be present in an implementation of an embodiment of the inventive system and methods. As shown in the Figure, one or more sources of data may be accessed or monitored as part of the inventive resource allocation system. These sources of data may include one or more of (a) a count of the transactions processed per unit of time by all users within an account 402, (b) the geographical location (or time zone or other identifier) of the account users 404 (or the majority of the account users), (c) the "vertical" corresponding to the account 406 (where this may represent the application or type of functionality being accessed by users), (d) the number or count of licenses available to the account 408, (e) the CPU usage per account 410, and any other or different parameters or characteristics found to be sufficiently indicative of (or correlated with) infrastructure resource use or demand.

General Implementation Details

As noted, embodiments of the invention create usage "signatures" for each tenant with respect to use of or access to one or more of the platform resources (where these resources may include, but are not required to include, CPU usage, hard disc memory usage, number of SQL cycles, etc.) based on a specific time scale. For example, this timeframe may be selected to be PST or EST, or London, UK standard time. This timescale selection synchronizes all the acquired information to the same frame of reference for purposes of later processing and evaluation. The inventive methods then extract usage data for one or more of the infrastructure resources for each tenant (or for a specific set of tenants) over a specific time frame or unit of time.

As an example, one may represent each day of usage of a set of cloud infrastructure resources (CIR) by a tenant as a 24-dimensional vector, where each dimension represents an amount of usage (as measured in Mb or Gb, for example) of the set of cloud infrastructure resources within a 1-hour period. Embodiments of the inventive system may then analyze the previous 90 days (or other time period) usage of CIR by each tenant and estimate the average daily usage (as a 24-dimensional vector) for each tenant. This usage vector is the usage "signature" of a tenant. Also, the method may generate an estimate of the standard deviation of the CIR usage for each hour to provide an estimate of the certainty of the mean value estimation for each hour. An example of such a set of signatures is found in FIG. 5(a).

The Table illustrated in FIG. 5(a) shows example resource usage data over a 24-hour period (as indicated by the columns labeled "0" to "23" for a set of tenants (labeled "Ten1" to "Ten12" in the figure). Each number in the Table represents a measure of the resource usage for that Tenant during that hourly period.

Next, an embodiment of the inventive system estimates a set of confidence intervals for the estimated CIR usage during the day. Using a similar approach, an embodiment may produce usage "signatures" for monthly usage, annual usage etc. (in order to be able to extract seasonality patterns in CIR usage by each tenant). Next, an embodiment may generate a dashboard for the cloud platform/resources management team showing daily, monthly and annual patterns observed for each tenant as measured on the same time scale.

As a practical example of how such data may be used, a platform management team may seek to more optimally distribute a set of N tenants among K servers/elements of the cloud platform, subject to one or more goals or constraints (such as that of optimizing a performance metric for each server, while minimizing the number K):

- This distribution/allocation may be performed by considering observed changes/variance in the observed "signatures" among different tenants, as segmented by location, vertical, number of users by tenant, different seasonal CIR usage in different counties, etc. Each seasonal pattern may be associated with local country holidays, events etc. in order to utilize that information in the distribution planning; and
- By observing different tenants' usage "signatures", an embodiment of the inventive system may assemble a "signatures" library which can be processed in aggregate to assist platform management/administration to make more optimal decisions regarding existing tenants' distribution among servers or the optimal allocation of new tenants, by comparing their attributes (e.g., location, number of users, vertical etc.) to existing tenants' attributes and their usage "signatures". For example, this comparison may be based on pattern matching or application of a machine learning technique to identify the characteristic or characteristics of an account or tenant that are strongly associated with a specific type of signature or change in signature.

Conventionally, tenants are placed on or allocated to a shared infrastructure without analyzing usage of the platform by each tenant. This can result in a negative impact on performance for all tenants on the shared infrastructure. Embodiments of the invention provide an infrastructure management team with a tool to better distribute different tenants among different servers of the platform, which is expected to provide better performance for each tenant.

Note that because of the sub-optimal/inefficient deployment of tenants on the shared infrastructure resulting from conventional approaches, a platform provider may be spending more financial and support resources on its infrastructure and customer support team than necessary. Embodiments of the inventive system and methods may result in more efficient use of these resources as well, in response to the optimal allocation of tenants to servers.

As noted, FIG. 4 (*a*) is a diagram illustrating certain of the data flow and data processing operations that may be present in an implementation of an embodiment of the inventive system and methods. The overall architecture diagram includes value-dimension data 410, for example the hourly CPU usage for each tenant. Note that depending on the specific implementation or goal, this data may include or consist of other value-dimensions as well (or instead of CPU usage), such as network bandwidth or memory usage.

The elements labeled data sources 402, 404, 406, and 408 represent different vector-dimensions for a given tenant in a multi-tenant cloud application. Examples of a tenant's vector dimensions may include Location, Vertical, License Count, # of Transactions per day, Overall Annual Revenue Value, etc. The inputs from the value-dimension and from the vector-dimension(s) are provided to a Processing Logic (illustrated as element 412), which generates the different vector-value combinations that are input to the K-nearest neighbor regression algorithm API (illustrated as element 414). Note that one of the inputs to this element (414) is a new-customer's vector-dimension 415, for which it is desired to "predict" or estimate the hourly CPU usage data or other value-dimension(s).

Once the vector-value for the new customer (also known as the performance signature for the new customer) is generated/predicted (as illustrated by element 416), it is used to identify the target server where the tenant should be housed. This is performed by a similar process to that described with reference to Example 1 below.

In general, implementation of an embodiment of the inventive system and methods may involve the following steps, stages, operations, etc.:

Example Implementation/Order of Operations
Capture of data
   the data structure that is the source for the inputs will typically be system notes and SQL logs;
   data may be collected in a regularly scheduled batch operation;
Construction of a tenant signature(s)
   based on the data that is used from the above— maximum CPU consumption by a tenant, either during each hour or during each month, for example (or one or more other value-dimensions). CPU consumption could be captured either directly or indirectly through SQL cycles—the number of SQL cycles could be converted to CPU consumption;
   An account/tenant signature is created or developed;
      Note that signatures could be generated over different time intervals, and/or with different degrees of granularity. For example, signatures could be based on a 1-week time interval, and with 1-hour granularity (meaning the length of a signature vector is 7*24=168); or, a signature could be based on a 1-day period with a granularity of 1 minute (meaning the length of a signature vector=24*60=1440);
Construction of a signature for all (or a specified set of) tenants that are using a specific element of the infrastructure (such as a server, extension, etc.):
   tenant parameters that may be used to select the set of tenants for which a signature is constructed may include:
   Tenant Parameter: Vertical
   Tenant Parameter: Geography
   Tenant Parameter: CPU Usage
   Other factor(s) found to be relevant to infrastructure use or demand;
Based at least in part on the signature(s), assist the system in making allocation decisions, predictions, or observations, such as:
   For an existing tenant/account: the "predictions" may be relatively high-level (such as one of the tenants in a group may need to be moved or re-assigned); however, in general the more granular the predictions, the more useful they will be;
   For placement or assignment of a new tenant/account— see Example 4 in the following description;
   A signature or set of signatures could be used to evaluate or identify which tenants or users are responsible for performance issues that are impacting others in a specific location and/or during a specific time interval; or
   Determining QoS metrics, ensuring compliance with contractual obligations regarding maintaining a certain level of service, performing optimizations of the financial impact of certain types of resource usage, etc.

FIG. 4 (*b*) is a diagram illustrating a sample tenant signature, in this case a signature corresponding to the CPU usage over time of a "typical" tenant in a multi-tenant application platform. Note that if the time scale is in PST, it is likely that the tenant X is based in the USA and somewhere on its west coast. If tenant X is an ERP application user with Q2 as their accounting year-end and the time scale is changed to represent t=1 year, then the center line will represent the month of June of a typical year. This "signature" would represent a relatively high level of activity towards the year end when book closing and related activities are at a peak, thereby using the most CPU/processing resources. For example, if tenant X is an eCommerce application user selling umbrellas (or other monsoon related accessories) and is based in India, then the month of June in the above signature may represent the peak shopping season.

As a further example of the implementation and use of an embodiment of the inventive system and methods, consider the following approach or implementation:

create usage "signatures" for each account/tenant of the desired cloud resource(s) (e.g., CPU usage, hard disc memory usage, number of SQL cycles, etc.) based on a common time scale (for example, this could be PST or EST or London, UK standard time). This permits the inventive methods to compare usage data for the platform resources across multiple tenants as standardized to the same point of reference with regards to time. For example, the method could represent each day of daily usage of cloud infrastructure resources (CIR) by each tenant as a 24-dimensional vector, where each dimension would represent amount of usage (measured in MB or GB, for example) of the cloud infrastructure resource(s) within a 1-hour period;

analyze the previous 90 days' usage of CIR by each tenant and estimate the average daily usage (as 24-dimensional vector) vector for each tenant. This vector may be considered a usage "signature" for each tenant. Also, estimate a standard deviation of the CIR usage for each hour to estimate the (un)certainty of a mean value estimation for each hour. This provides a confidence interval for the estimated CIR usage for each hour during the day;

using a similar approach, generate usage "signatures" for monthly usage, annual usage, etc. for a tenant to be able to extract seasonality and other patterns in CIR usage by each customer;

generate a display (such as a dashboard) for use by a system management team showing daily, monthly, seasonal, and annual patterns observed for each tenant, as measured on the same time scale. Given this information, a management team would be able to more optimally distribute the existing N tenants among K existing servers of the cloud platform, and as a result optimize the performance on each server while minimizing the number K (such as by shifting one or more tenants to a server or server group that can better handle their needs during a period of time, implementing a form of load balancing based on the demand by multiple tenants over a period of time, etc.);

the distribution or redistribution of tenants may be implemented by considering the potential variance in observed "signatures" among different tenants by location, vertical, number of users by tenant, different seasonality CIR usage in different counties, or other relevant factor. Each seasonality pattern could be linked to local country holidays, events, etc. to utilize it in the distribution planning; and By observing different tenants' usage "signatures", a system can assemble a "signatures" library which may help a cloud management team to make a more optimal distribution of new tenants among the available resources; this may be done by comparing a new tenants' attributes (location, number of users, vertical, etc.) to existing tenants' attributes and the existing tenants' usage "signatures", and using that information to estimate or predict the expected usage signature for a new tenant/account or set of users.

Example Use Cases or Applications of the Inventive System and Methods

Example 1

Assume the system has 3 servers in the cloud, among which are distributed multiple tenants. Suppose there are 12 current/existing tenants/companies to distribute among the available 3 servers. Suppose that limitation for each server is as follows: it allows maximum CPU usage of 128 GB at each specific moment of time. Using an embodiment of the inventive methods, CPU use is analyzed for all 12 tenants during the previous 90 days, and a resulting set of hourly (using for example the PST time zone) average CPU usage factors were created, where k-th (k=0, 1, 2 . . . 23) hour average usage=mean value $(k_i)$, for i=1, 2, 3, . . . 90 previous days. Here $k_i$ represents average CPU usage at hour k during day i for each separate tenant. As a result, the inventive methods may calculate the following 24-dimensional vectors ("signatures") representing average CPU usage during the average day by the 12 existing tenants.

Originally, tenants 1, 2, 3 and 4 have been placed on shared server number 1, located in a data center in the USA; tenants 5, 6, 7 and 8 have been placed on shared server number 2 located in Europe; and tenants 9, 10, 11 and 12 have been placed on shared sever number 3 located in Asia. The original logic behind the placement(s) was to place tenants having the same/similar time zones of their headquarters/main operations/main customers onto shared server(s). So, main operations (or headquarters/main customers) of tenants 1, 2, 3, 4 are in the USA; main operations of tenants 5, 6, 7, 8 are located in Europe; and the main operations of tenants 9, 10, 11, 12 are located in Asia.

Note that this arrangement is not optimal; as understood from the Table of 24-dimensional vectors (the "signatures", as shown in FIG. 5(a)) representing average CPU usage during the average day by 12 existing tenants, the tenants on these shared servers are encountering operations performance problems. For example, tenants 1, 2, 3, 4 (who share the same server 1) are having performance problems during hours 10-13 (a total of four hours of performance issues) because during those hours, total demand for CPU usage from those tenants is higher than the inherent 128 GB CPU limitation for the server. Similar performance issues are experienced by tenants 5, 6, 7, 8 who are sharing server 2. They experience performance issues during hours 1-4 (a total of four hours of performance issues) because during those hours, total demand for CPU usage from those tenants is higher than the 128 GB CPU limitation for the server. Similar performance issues are experienced by tenants 9, 10, 11, 12 who are sharing server 3. They experience performance issues during hours 18-21 (a total of four hours of performance issues) because during those hours, total demand for CPU usage from those tenants is higher than the 128 GB CPU limitation for the server.

However, an embodiment of the inventive system and methods may be used to improve this situation. Using the 24-dimensional vectors ("signatures") representing average CPU usage during the average day by 12 existing tenants, a resource manager can re-distribute some or all of the 12 tenants among 3 servers in order to make the performance issues they experience either disappear or undergo a significant reduction (in terms of time duration). For example, one can re-distribute the 12 tenants among 3 servers as follows: place tenants 1, 2, 5, 6 on server 1 in the USA (even though tenants 5 and 6 are from Europe), place tenants 3, 4, 9, 10 on server 2 in Europe (even though tenants 3 and 4 are from USA), and place tenants 7, 8, 11, 12 on server 3 in Asia (even though tenants 7 and 8 are from Europe). As a result of this re-arrangement, tenants 1, 2, 5, 6 on shared server 1 would not be expected to experience issues with performance; tenants 3, 4, 9, 10 on shared server 2 would not be expected to experience issues with performance; and tenants 7, 8, 11, 12 on shared server 3 would not be expected to experience issues with performance. This is a much more optimal arrangement than the original distribution, where each tenant encountered performance issues for four hours each day.

Example 2

In this example, assume the same 12 tenants discussed in Example 1. However, now the goal is to minimize infrastructure spending by the platform operator without sacrificing the performance quality for existing tenants, or at least by minimizing any drop in performance for the existing tenants. In this scenario, the operator/company would like to distribute the 12 tenants among just 2 servers instead of the current 3 servers, and thereby reduce infrastructure costs by ⅓ as compared with the use of 3 servers.

A resource manager may desire to do this in the most efficient way in terms of the impact on performance quality for the existing 12 tenants. The 24-dimensional vectors ("signatures") representing average CPU usage during the average day by the 12 existing tenants, as discussed in Example 1, can be used to resolve this problem. Suppose that there are 2 servers available; server 1 is in a data center in the USA, and server 2 is in a data center in Europe. Using the 24-dimensional vectors ("signatures"), a manager can re-distribute all 12 tenants among the 2 available servers as follows: tenants 1, 3, 5, 7, 9, 11 are put on server 1 in the USA data center (even though tenants 5, 7 are from Europe and tenants 9, 11 are from Asia); and tenants 2, 4, 6, 8, 10, 12 are put on server 2 in the Europe data center (even though tenants 2, 4 are from the USA and tenants 10, 12 are from Asia). As a result of this re-distribution, the manager can reduce infrastructure cost by ⅓, while improving performance for all 12 tenants; this is because in the re-distributed allocation, none of 12 tenants would have performance issues (instead of all 12 tenants having performance issues for four hours during each day in the original tenant distribution among 3 servers). Note that in the previous allocation, none of the tenants exceeded the CPU limitation. Thus, even if total CPU consumption (by all tenants) was above the CPU limitation during some time period, it still would be better than the original CPU consumption (by all tenants) prior to the "re-distribution".

Example 3

In this example use case, seasonal patterns of resource usage are extracted and utilized for purposes of allocating resources to tenants (or tenants to resources). Denote $M_j$—a monthly average maximum demand at any given day during month j per tenant in terms of CPU usage observed at month j (j=1, 2 . . . 12) and computed (i.e., an average taken) over the last 3 years. For example, to compute average $M_{11}$ for a specific tenant for the year of 2016, the system would compute $M_{11}$ (corresponding to the month of November) for that tenant for the month of November of 2013, 2014 and 2015, and then take the average of those three values. Assume for this example that there are 6 current tenants distributed among 2 shared servers: one server is in a data center in the USA, and a second server is in a data center in Asia. Assume also that both servers allow maximum CPU usage of 128 GB at each specific moment of time. Using the $M_j$ values for each tenant, one can represent seasonal CPU usage/demand by each tenant as a 12-dimensional "signature" vector, where each dimension represents the monthly average maximum demand by the tenant for any given day during a specific month. Note that FIG. 5(b) is a Table showing seasonal usage by a set of tenants in the form of 12-dimensional "signature" vectors.

Assume that all 6 tenants are e-commerce tenants. Tenants 1, 2, 3 are from the USA and have originally been placed on server 1 in a data center in the USA; tenants 4, 5, 6 are tenants from India and have originally been placed on server 2 in a data center in India. Examining the "signatures", one can see that most of the tenants have no issues with performance, except for tenants 1, 2, 3 who are having issues with performance in November and December (note that during those months, the total demand for CPU usage from those tenants is higher than the 128 GB CPU limitation for the server). Note that there are major holidays in the USA (Thanksgiving and Christmas) during this period, when many more people are buying items online and hence the system encounters a relatively large spike in CPU usage by those tenants in November and December. One can observe a similar situation for e-commerce tenants 4, 5, 6 from India; they experience a spike in CPU usage during the months of March and October (note that during those months, total demand for CPU usage from those tenants is higher than the 128 GB CPU limitation for the server). This is most likely the result of local or regional holidays.

For e-commerce tenants it is particularly important to make sure that they don't encounter significant performance issues; such a problem may translate into an undesirable customer experience and as a result, lost revenue (e.g., some customers are not willing to wait an extended period of time for a product page to load on their computers/smartphones). A cloud/SaaS platform provider/operator may use an embodiment of the inventive system and methods to address such tenants' requirements. In this case, creating and utilizing a 12-dimensional "signature" vector can be helpful in reducing e-commerce platform/website performance issues. For example, in this situation a possible approach may be as follows: place tenants 1, 2 and 4 onto server 1 in a data center in the USA (even though tenant 4 is from India), and place tenants 3, 5 and 6 on a server in a data center in India (even though tenant 3 is from USA). In this allocation, all 6 tenants would not encounter a performance issue (or at least would not encounter as severe an issue) during the year. Note that after the "re-distribution" of the tenants, the predicted total CPU usage on both servers would be below the 128 GB CPU limitation during all 12 months; thus, in this case, the system can eliminate seasonal performance issues/problems with regards to both the India server and the US server.

Example 4

This example of the use of an embodiment of the inventive system and methods involves determining how best to distribute a newly acquired tenant or tenants among different servers and/or different data centers. In the previous examples, the inventive methods were used to address challenges encountered by currently existing customers for whom "signature" vectors describing their different CPU demand could be constructed. In this scenario, assume the platform operator or provider acquired $N_1$ new tenants and needs to distribute them among $N_2$ servers located in 2-3 (or more) different data centers. The issue becomes how best to allocate the new tenants in order to optimize the platform performance for all $N_1$ of the new tenants.

In one embodiment, the system may create a "prediction" model for the "signature" vectors described with reference to examples 1 and 3, for all $N_1$ of the new tenants. In order to do this, the inventive methods may be used to analyze historical data concerning the currently existing tenants and their observed "signature" vectors. This may be done by capturing information regarding one or more "attributes" of the new tenant and existing tenants. For example, these attribute(s) may consist of one or more of the following: 1) the primary vertical business area of a tenant (such as "e-commerce", "software", "manufacturing", "retail", "wholesale distribution", etc.); 2) the geographical time zone of the main operations of a tenant (such as Europe, USA, Asia etc.); 3) the number of employees of the tenant; 4) the number of licenses purchased by the tenant; 5) the estimated number of transactions per day/month (for e-commerce, retail and possibly other verticals); 6) the number of software modules a tenant is buying from a cloud computing/SaaS provider; or 7) the number of items for sale in a tenant's product catalog (for e-commerce, retail and possibly other verticals).

Given a set of one or more such attributes, the inventive method represents each of the new and existing tenants as a vector consisting of a value for each attribute. For existing tenants, the method also determines an observed "signature" vector (hourly as in example 1, and/or monthly, as in example 3) associated with each tenant. For a new tenant, it is desired to estimate/predict a corresponding "signature" vector. FIG. 5(c) is a Table showing a selection of rows from the Tables shown in FIGS. 5(a) and 5(b), consisting of existing and new tenants in a vector format representing attribute values.

Next, the system may use a suitable machine learning algorithm (or other form of pattern matching, statistical analysis, etc.) to make a "prediction" of the expected "signature" vector for each tenant in the Table of FIG. 5(b) by utilizing data in the Table of FIG. 5(a). For example, the method may use a K-nearest neighbor (k-NN) regression/classification model. In order to do this, for each tenant the system makes a "prediction" from the Table of FIG. 5(b); first determine the combination of "vertical" and "geographical" zone values for a tenant, and then consider only the subset from the Table of FIG. 5(a) where the vertical is equal to the vertical of that tenant from the Table of FIG. 5(b) and the geographical zone is equal to the geographical zone of the tenant from the Table of FIG. 5(b). For this example, assume that the vertical of that tenant X is "e-commerce" and the "geographical zone" is "USA". Then an eligible subset from the Table of FIG. 5(a) which can be used in the prediction model is the sample data shown in the Table of FIG. 5(d).

Next, standardize the values in the columns "Number of employees", "Estimated number of transactions/day", "Number of software modules purchased" and "Number of items for sale in product catalog" using a suitable formula for standardizing a set of values value $Z_i$ of a random variable Z, having a mean value=mean (Z) and having a standard deviation=stdev(Z):

$$Y_i=(Z_i-\text{mean}(Z))/\text{stdev}(Z), \quad (1)$$

where the random variable Z represents all values from the Table in FIG. 5(c) and is calculated separately for each specific column. For example, if it is desired to standardize value $Z_i$=235 from the Table and column="Number of employees", then Z={set of all values from the Table where column="Number of employees"}.

Next, use the same formula (1) to standardize all values (from the columns "Number of employees", "Estimated number of transactions/day", "Number of software modules purchased", and "Number of items for sale in product catalog") of the vector for tenant X from the Table of FIG. 5(b) for which we are making a prediction of the "signature" vector. Next, apply a K-nearest neighbor (k-NN) regression model (with K=20, for example) for standardized vector values of tenant X from Table 2 (and the columns "Number of employees", "Estimated number of transactions/day", "Number of software modules purchased" and "Number of items for sale in product catalog"), and using values of (or from) the "signature" vectors of its closest K=20 neighbors from the Table of FIG. 5(a), estimate a "signature" vector for tenant X from the Table of FIG. 5(b).

In this approach, the "signature" vector of tenant X from the Table of FIG. 5(b) would be an average vector of the "signature" vectors of its K=20 closest vectors (in standardized format as well) from the Table of FIG. 5(a). In the same way one can make a prediction for a signature vector for each new tenant from the Table of FIG. 5(b). "Signature" vectors may be generated in an "hourly" format, as described with reference to Example 1, or in a "monthly" format, as described with reference to Example 3. Note that it is necessary to populate the column of the Table in FIG. 5(a) "Signature vectors" with either hourly "signature" vectors (as described in Example 1), or monthly "signature" vectors (as described in Example 3). After the "predictions" are generated, a system administrator may follow the decision logic described with reference to examples 1, 2, 3 to make the performance experienced by all of the new customers optimal (or more optimal than might be obtained using other allocation methods).

Further Aspects of the Optimization of Resource Allocation

In a multi-tenant environment there is an on-going and changing demand for certain resources (e.g., computing or processing power, data storage, access to certain applications or features, implementation of certain workflows, etc.) among the N multiple tenants of the environment. The environment includes components and processes used to implement and support a cloud-based infrastructure, with a set of resources being made available by the operator of the multi-tenant platform for use by the tenants to store, process, and provide data in response to queries, searches, or requests for reports.

As noted, these infrastructure resources could include one or more of the following: CPU use, memory capacity, network bandwidth, data transfer rates, etc. Typically, these resources are distributed "in the cloud" amongst K different servers. In general, an operator or provider of a multi-tenant platform would prefer to distribute the N tenants among the K different servers in such a way that the time-changing demand for resources (that is, the demand for each resource over time) would be most efficiently matched with the available supply of that resource.

Note that one possible definition of "most efficiently matched" might be that of making sure that resource consumption is within its limitations, because in most cases there are a finite number of servers and a limitation on each resource for each server, and also an overall network limitation (i.e., total network bandwidth). Another way of defining "most efficient" might be that of seeking a more "uniform" consumption of some or all resources on the different servers, meaning, that ideally, there should not be a situation where there is relatively or significantly more consumption of a resource on one server than on another one.

In the case where the supply/availability of a resource or resources is insufficient to meet the total demand generated by the N tenants at a given time or over a given time period, then it is desirable to distribute the N tenants among the K different servers in such a way that no one specific tenant is being "harmed" significantly more than other tenants (where here, "harmed" means that a tenant would encounter a significant performance issue, for example, a significant decrease in the speed of executing certain cloud-performed operations). Note that in some embodiments of the invention, a goal is to minimize the value or degree of the maximum hourly measured "spike" (this goal is captured in formula 3 below) in resource consumption. In this form of goal, the higher the spike, the worse that a tenant or tenants are being "harmed"; therefore, minimizing a "spike" means minimizing the maximum "harm" on an hourly basis.

Cloud-based data processing operations that could be impacted include, for example, one or more of the following: financial transactions, purchase orders, SQL based queries, search based queries, or a data backup that enables a tenant to back up certain data from a specified period of time; afterwards, outdated data backups could be erased while new data backups are being stored. Note that even when the supply of resources provided by the K different servers is enough for the total expected demand generated by the N tenants, it is desirable to distribute a set of tenants among the available servers in such a way that the total demand for resources are allocated approximately evenly among the K different servers. This is because it is advantageous to allocate unused resources in such a way that they are distributed approximately evenly among the K different servers; this permits an unexpected spike in resource demand to be more likely to be met efficiently, as it is typically unknown in advance on which server such a spike in demand might occur.

Some embodiments of the invention introduce, implement and utilize an innovative algorithm (termed "VDD" in the following description) which operates to automatically distribute N tenants among K different servers to achieve one or more of the goals/criteria discussed above. Note that another potential or additional goal could be to estimate the required number of servers to ensure that the estimated resource consumption is within specific technical limitations. This would be a useful goal in the case of executing the inventive processes multiple (M) times (for example 100 times), and finding that the lowest local minimum of the maximum hourly consumption continues to result in exceeding a technical limitation.

In such a case, it is important to understand what would be the lowest (and therefore the cheapest for the cloud services provider) number of servers, K, such that the lowest local minimum of the maximum hourly consumption is within the technical limitation(s). For this situation and use case, one can incrementally increase the number of servers by 1 ($K_{i+1}=K_i+1$) and re-run the inventive algorithm for this new number of servers, $K_{i+1}$. This iterative process may be repeated until the lowest local minimum of the maximum hourly consumption is within the technical limitation(s).

A similar process may be applied to satisfy another goal: assume that there are N new tenants which need to be distributed among K servers (where K is unknown). The goal is to determine the minimum value of K, such that the lowest local minimum of the maximum hourly consumption is within the technical limitation. In order to do this, one can first check whether the value K=1 works; if not, then execute the inventive processes M times (where M is a number of times the inventive process is executed to select the "best" possible distribution of N tenants among K servers) for K=2. If K=2 does not satisfy the limitation(s), then execute the inventive processes M times for K=3 etc., until the lowest local minimum of the maximum hourly consumption is within the technical limitation(s).

In this use case or embodiment, an implementation of the inventive method may include the following steps, functions, operations, or processes:

First, model demand for a resource from a specific tenant as vector, where each dimension of the vector represents a time unit (e.g., minute, hour, day, month, etc.). For example, if it is desired to describe daily resource demand in terms of 1 hour incremental intervals, then represent each tenant's demand as a 24-dimensional vector. If it is desired to describe yearly resource demand in terms of 1 day incremental intervals, then represent each tenant's demand as a 364-dimensional vector. The chosen increment is typically up to the infrastructure administrator or manager, and would be expected to depend on the use case or goals;

For example, if one wants to optimize across different time zones and tenants whose resource use may be sensitive to that factor, then 24 hour daily vectors are a good representation of resource consumption during the average day. Similarly, if one wants to optimize based on tenants whose resource use may be sensitive to the occurrence of holiday seasons (such as eCommerce tenants across the globe, whose "spikes" in activity often happen in conjunction with their local, regional, or national holidays), then either 12 monthly vectors, or 364 day yearly vectors are a suitable representation of resource consumption during the average year.

Suppose we have N vectors $X_i$ (i=1, ..., N), where $X_i=(X_{i1}, \ldots, X_{in})$. Denote $$\|X_i\|_\infty = \max_{j=1,\ldots,n}(X_{ij}) \quad (1)$$

Further assume that $$\|X_i\|_\infty > 0 \quad (2)$$

for all i=1, ..., N. Also, assume that $X_{ij} \geq 0$ for all i=1, ..., N and j=1, ..., n.

A goal of the inventive process is to distribute N Vectors $X_i$ among K buckets, such that a "fitness" metric $$\max_{j=1,\ldots,k}\|S_j\|_\infty \quad (3)$$

is minimized among all possible distributions of N Vectors $X_i$ among K buckets, where Sj is a sum of all vectors distributed in j's bucket.

Definition 1.

Define the term "GM" to be a global minimum of the distributions of N vectors among K buckets, when the following value GM is reached on some specific vector distribution $D_G$:

$$GM = \min_{all\_possible\_vectors\_distributions} (\max_{j=1,\ldots,K}\|S_j\|_\infty) \quad (4)$$

Definition 2.

Define "LM" to be a local minimum of the distributions of N vectors among K buckets, reached on some specific vector distribution $D_L$:

$$LM = \max_{j=1,\ldots,k}\|S_j\|_\infty \text{ on vector distribution } D_L \quad (5)$$

and $$LM \leq \max_{j=1,\ldots,k}\|S_j\|_\infty \text{ on other vector distributions } D_O \quad (6)$$

such that $D_O$ is obtained from $D_L$ by changing the assigned bucket of one vector $X_i$ from distribution $D_L$.

In the following, refer to the metric described above as the "fitness" metric. In embodiments of the invention, one is trying to minimize the maximum hourly measured "spike" (as is captured by the "fitness" metric) of the resource consumption. Assume that the higher the spike, the worse that tenants are being "hurt". Minimizing the "spike" means minimizing the maximum "hurt" on an hourly basis.

Because of this goal, the method may utilize L-infinity vector norms instead of the standard Euclidean norm. It is calculated as explained above where Sj is a sum of all vectors distributed in j's bucket. Note that if the goal was different, then it could potentially change the definition of the fitness metric as well (thus, the fitness metric may be use case dependent). For example, suppose that instead of minimizing the maximum hourly measured "spike" of resource consumption, one desires to minimize the maximum "overall" consumption of a resource among K servers. Here "overall" means that the process does not consider just the one "worst" hour of resource consumption, but all hours of operation instead.

For instance, in this "overall" consumption example, having a situation where the tenant has 10 different hours in which resource consumption is above threshold by 19 units is worse than having a situation where there is only 1 hour where resource consumption is above threshold, even though resource consumption during that hour is 20 units above threshold. Note that in the case of a goal of minimizing the maximum "spike", it would be vice-versa: having a situation of 10 different hours where resource consumption is above threshold by 19 units is preferred/better than having a situation where there is 1 hour where resource consumption is above threshold during that hour by 20 units.

So, in the case of an "overall" goal, the standard Euclidean norm would capture and apply to that use case. In that case, all L-infinity norms will be replaced by Euclidean norms instead. And the fitness metric for that "overall" use case would be $$\max_{j=1,\ldots,k} \|S_j\|$$

(also in terms of Euclidean norm). Then the VDD process/algorithm is followed by replacing L-infinity norms by Euclidean norms. In a similar way, the fitness metric could directly represent the metric a user is trying to minimize in other use cases, and all other vector norms would be changed accordingly.

Vectors Distribution Descent (VDD) Process

Figure 6:
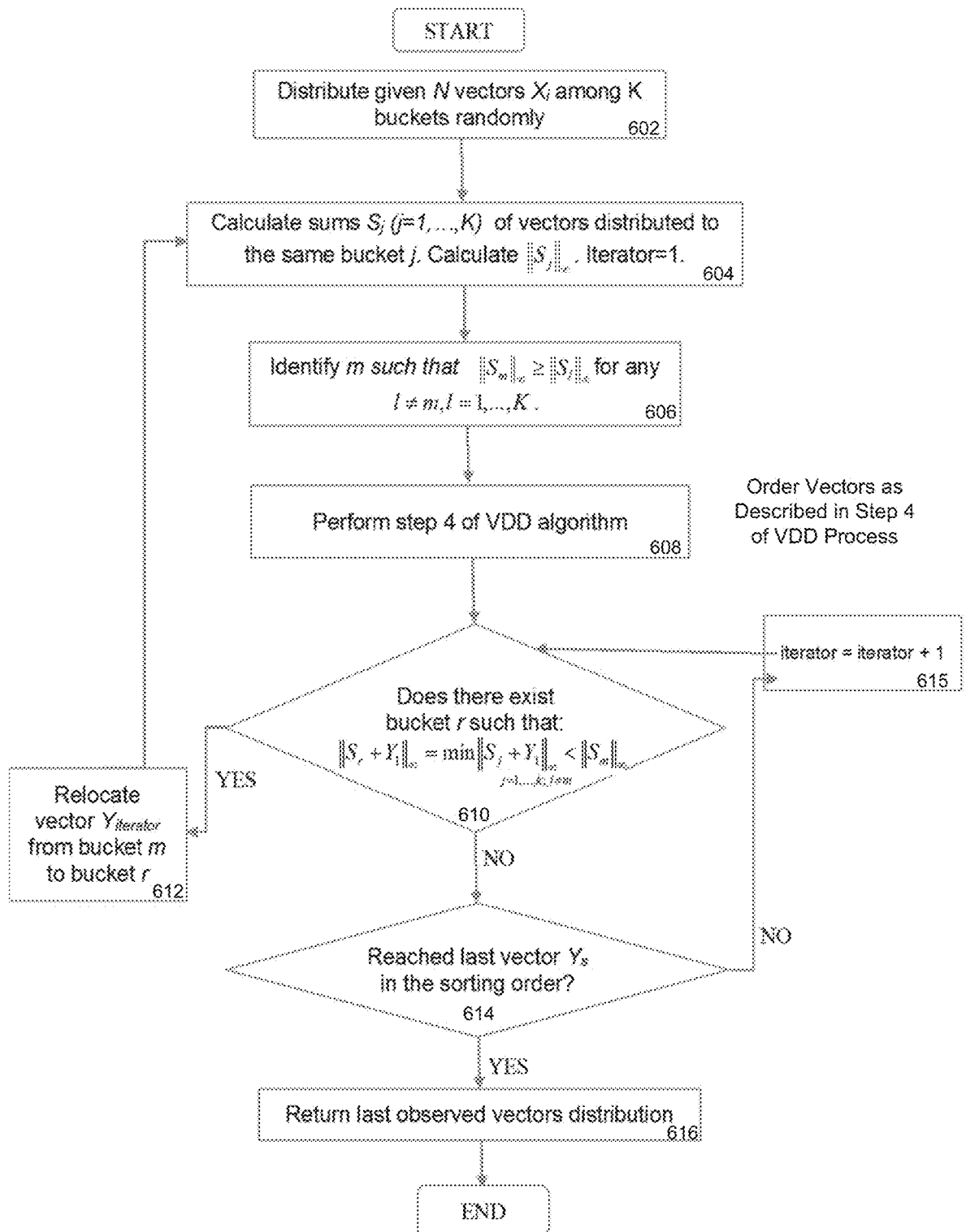
FIG. 6 is a flow chart or flow diagram illustrating a set of stages or steps that may be used to perform a process, method, function or operation (such as the VDD process described herein) as part of implementing an embodiment of the inventive system and methods.

FIG. 6 is a flow chart or flow diagram illustrating a set of stages or steps that may be used to perform a process, method, function or operation (such as the VDD process described herein) as part of implementing an embodiment of the inventive system and methods. One outcome of the VDD process or sequence of operations is to redistribute one or more accounts/users (as represented by a vector that represents an account/user's resource consumption over time) from a server identified as having an undesirable set of account/users to one identified as having a more desirable (or in some cases, most desirable) set of accounts/users. An example implementation of the VDD algorithm or process would typically include the following operations or functionality:

1) Distribute a given N Vectors $X_i$ among K buckets randomly or pseudo-randomly. Generally, each vector has an equal probability (which are each equal to 1/K) of being distributed to each/any specific bucket (as suggested by stage or step 602). In some embodiments, each vector represents a set of resource consumption data over a time interval or intervals for an account/tenant or set of users (such as a data record where the consumption/allocation is a number or value and each field in the record corresponds to the consumption or allocation of a resource during a specified time interval)—examples are shown in the Tables of FIGS. 5(*a*), 5(*b*), 5(*c*), 5(*d*), and 5(*e*);

2) For a distribution $D_1$ of N Vectors $X_i$ among the K buckets, calculate the sums $S_j$ (j=1, . . . , K) of vectors distributed to the same bucket j. This corresponds to adding the resource consumption or allocation during a specific time interval for all accounts/users of the server. Next, determine or calculate a "fitness metric" for the server—this is typically represented by the "norm" of the summed vectors, $\|S_j\|_\infty$ (j=1 . . . , K); see the previous discussion of how a fitness metric might be chosen and calculated.

As an example, a fitness metric may be chosen based on the specific use case (which may depend on the accounts, location, seasonal events, time zone, etc.) and goal; the increment size (i.e., minute, hour, day, month) of the vector, which represents the size of the "bucket" for which the resource consumption is determined, and its period (i.e., coverage or length, such as day, month, year, etc.) may also be determined by the use case, such as for "time zone" sensitive tenants or "holidays seasons" sensitive tenants (as suggested by stage or step 604).

3) Identify m such that $\|S_m\|_\infty \geq \|S_l\|_\infty$ for any l≠m, l=1, . . . , K (as suggested by stage or step 606)—this step is determining the server for which the resource consumption of all accounts/tenants/users is the greatest. This step operates to determine the server from which it is most desired to remove one or more accounts or tenants.

Note that in some cases, it may be necessary or desired to identify a server which does not have the greatest value of the norm as the server from which one or more accounts or tenants is to be removed; for example, if there are business reasons, security, or technical requirements which prevent removing an account or tenant from the server having the largest value of the norm (such as a contractual obligation, security level available on a specific server, etc.).

Note also that the norm may be defined in such as manner as to emphasize or provide greater weight to certain accounts, certain time periods or intervals, certain resources, certain QoS requirements, etc. Further, the weight or weights applied to certain accounts, time periods or intervals, resources, or QoS requirements may depend on one or more of a tenant's business related data (such as ERP, CRM, HR, financial) and/or data used to characterize the operation of the overall business data processing (multi-tenant) platform. This enables the norm, and hence the resource allocation decisions that are made based on the norm, to vary based on a tenant's current/real-time operational data. This may be useful in cases where it is found that changes to the data or changes to the velocity of the data are strongly correlated with a change in resource demand, or in the resources being used by a tenant (or by a group of tenants in the same vertical, etc.).

4) Sort (arrange) the vectors $X_i$ belonging to the server from which one or more accounts or tenants will be removed (the m-th bucket) in such a way that the sequence $\|S_m-X_i\|_\infty$ is a non-decreasing one. Denote those sorted $X_j$ vectors as $Y_k$, k=1, . . . , s, where s is total number of vectors $X_i$ belonging to the m-th bucket and $\|S_m-Y_p\|_\infty \geq \|S_m-Y_q\|_\infty$ for p>q (as suggested by stage or step 608); and 5) Iteratively evaluate the result of a potential re-distribution of vector $Y_1$ to other buckets (i.e., select the tenant currently assigned to server m that has the minimum impact on the norm of the server when removed, while its removal reduces the norm of the server)—does there exist a bucket r such that (as suggested by stage or step 610);

$$\|S_r + Y_1\|_\infty = \min_{j=1,\ldots,k; j \neq m} \|S_j + Y_1\|_\infty < \|S_m\|_\infty ? \quad (7)$$

This is in effect identifying an alternate server (r) for which the addition of the tenant represented by vector $Y_1$ would produce the minimum resulting norm, with a norm that is still less than that which would result if the tenant remained on its present server (m). If the answer is "Yes", then relocate vector $Y_1$ from bucket m to bucket r. Next, repeat all the steps starting from step 2 above (i.e., calculate the sums $S_j$) for a new distribution of vectors resulting from this relocation of vector $Y_1$ (as suggested by stage or step 612). If the answer is "No" then repeat step 5 above for a next vector in the sorting order ($Y_2$ where in the previous execution of step 5, the vector used was $Y_1$, as suggested by stage or step 614).

In general, $Y_{i+1}$ in the case of the previous vector in the sorting order was $Y_i$; in general, the process repeats step 5 (represented by stages or steps 610, 612, 614, and 615) for the next vector in the sorting order. If the previous vector in sorting order was then repeat step 5 for the next vector in sorting order, $Y_{i+1}$. The process terminates if, when one reaches the last vector $Y_s$ in the sorting order, then one still gets the answer "No" in step 610; the algorithm/process stops and returns the last observed vector distribution (as suggested by stage or step 616).

Note that using the VDD algorithm/process does not guarantee reaching a global minimum (GM) as defined in Definition 1, but it does permit finding a local minimum (LM). So, the VDD algorithm provides what is possibly only a sub-optimal solution. Because of this possibility, in some cases it may be beneficial to execute the VDD algorithm multiple times (for example, 100 times) to improve the fitness metric $$\max_{j=1,\ldots,k} \|S_j\|_\infty,$$

and select a distribution of the vectors with the smallest fitness metric. In order to guarantee that the process reaches a GM, one may evaluate the fitness metric $$\max_{j=1,\ldots,k} \|S_j\|_\infty$$

for each possible distribution of N Vectors $X_i$ among K buckets. This approach would work well for a relatively small number of N and K, but would be computationally intensive and impractical in some cases for large N and K; hence the value of the VDD algorithm in reaching at least a sub-optimal solution in a relatively (computationally) practical manner.

In a general case, the process needs to make $$\frac{K^N}{K!}$$

calculations of the fitness metric, corresponding to all different distributions of N Vectors $X_i$ among K buckets. For example, assume that N=5 and K=2. In that case the process needs to make a calculation of the fitness metric for $$\frac{2^5}{2!} = 16$$

different vector distributions, which is relatively easy and computationally inexpensive to do to reach a global minimum value for the fitness metric. However, in the case of N=1000 and K=100, the process would need to make $$\frac{100^{1000}}{100!}$$

calculations of the fitness metric, corresponding to all possible vectors distributions, to reach a global minimum value of the metric. This would be an extremely computationally expensive procedure, and is likely not practical or efficient in many situations and use cases.

Note that in one embodiment, a user may apply the VDD algorithm, where it considers N "signatures" vectors corresponding to N tenants and K different servers (the servers play the role of buckets in the VDD algorithm) and a user desires to intelligently distribute N tenants among K servers by optimizing the fitness metric. Without a loss of generality, the fitness metric expressed above could be replaced by another fitness metric and the VDD algorithm would still proceed in a similar fashion.

As noted, another possible use case beyond assigning a set of N tenants to K servers based on a defined fitness metric is to identify the lowest (meaning cheapest for a cloud infrastructure service provider) number of servers K, such that the lowest local minimum of maximum hourly consumption is within technical limitations.

Areas other than platform resource allocation that might benefit from implementation and use of the VDD algorithm/process may include configuration of network nodes that control transportation or data transfer, control of electricity consumption in an electrical grid, or control of solar/wind energy infrastructure; consumers (people and organizations) are considered tenants, and each electrical power generation plant, solar generation plant, or wind generated electricity plant may be considered a "server" in these types of use cases.

Note that aspects of the VDD algorithm/process or of the example (assignment of N tenants to K servers) may be able to be affected or controlled by a tenant's stored business related data. In such cases, the process/algorithm can be used periodically to assign the tenants, but can consider data values or resource usage by the tenants in a pseudo-real time manner. For this use, one could monitor tenants' data and hence their "signatures" as they evolve in pseudo-real time. This could be useful to detect or monitor for a potentially large change in one or more tenant's "signatures". This may be important in some operating situations because the inventive process assumes that the signatures are static, and if they are subject to a significant change within a relevant timescale, then the resulting assignment of tenants/accounts to servers may change.

Therefore, once a significant signature change is observed in at least one tenant, it may be beneficial to re-run the inventive VDD process/algorithm to make sure the system still has "the best" distribution of the tenants among the K servers. The potential for changes may indicate an increased demand for resources over the entire platform and may be alleviated by the purchase of new servers to ensure that the lowest local minimum of the maximum hourly consumption is within technical limitation(s); similarly, removing a server (if signatures became "smaller", for example) and thus reducing infrastructure ownership and maintenance cost is also an option. This might involve triggers based on tenant data, or a fitness metric that is selected based on tenant data, etc.

The operations illustrated in the flow chart or flow diagram of FIG. 6 may be expressed in a general sense that captures the concept represented by the mathematical operations, as follows:

the inventive VDD process/algorithm first randomly distributes N tenants among K servers (or considers a given initial distribution), and then iteratively checks which server is the "worst" in terms of resource consumption; it then searches for a "best" (in terms of resource consumption) available server (or most desirable server) to relocate some of the "worst" server's tenants to the "best" server. If such a "best" server is identified, then the VDD process/algorithm relocates one of the tenants from the "worst" server to the "best" server, and the process is repeated starting from the identification of the "worst" server for the next iteration etc. The process stops when it does not provide a benefit to relocate any tenant from the current iteration's "worst" server to any other server, because it would make other servers where the tenant could be relocated even "worse" than the "worst" server. Note that the final vector distribution will be at least a sub-optimal distribution.

Figure 7:
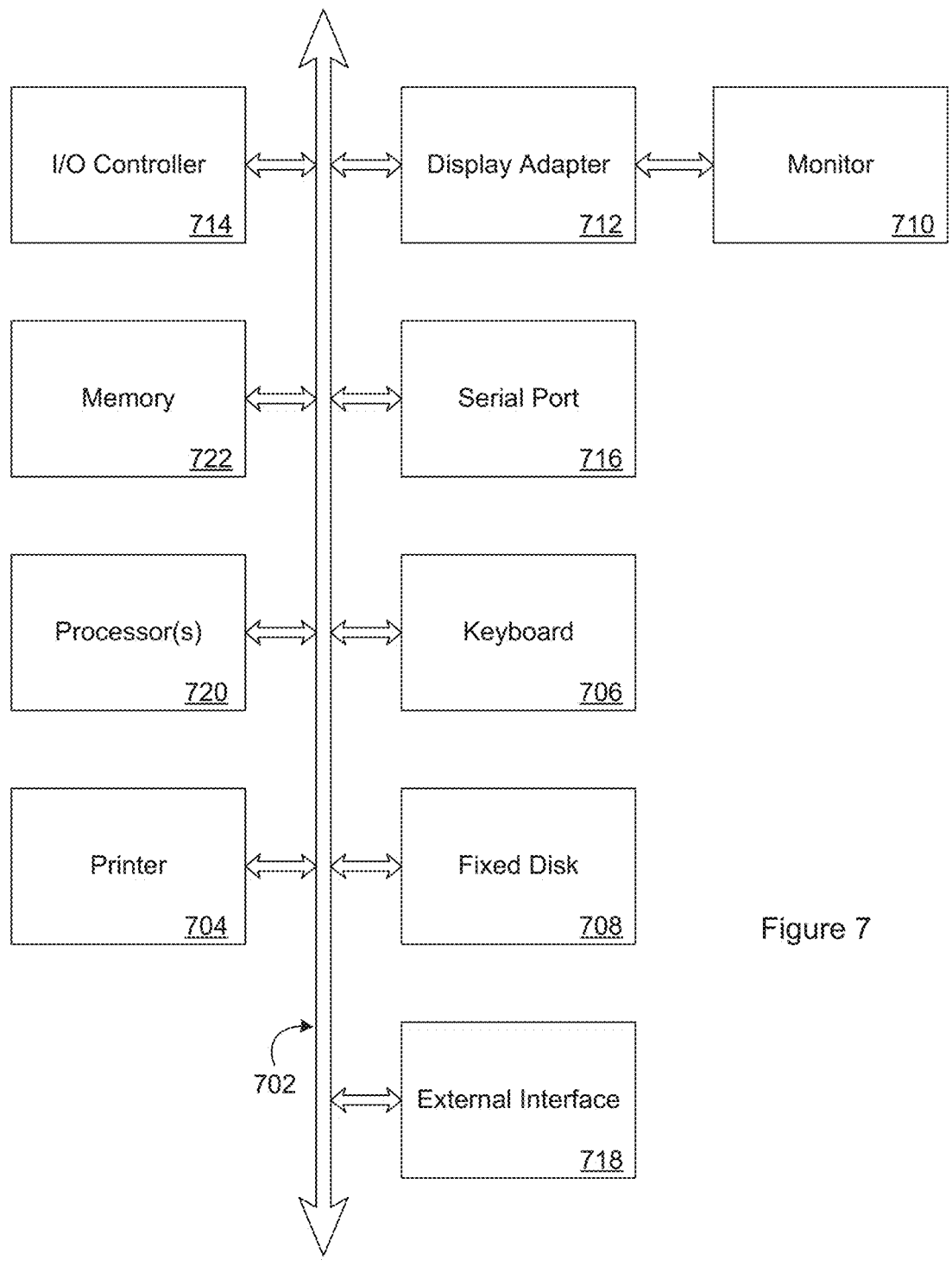
FIG. 7 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for efficiently managing access to and usage of an extension or application installed on a multi-tenant platform may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 7 is a diagram illustrating elements or components that may be present in a computer device or system 700 configured to implement a method, process, function, or operation in accordance with an embodiment of the invention. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for managing data processing platform resources for users of a multi-tenant platform, comprising:
    accessing data regarding a usage of a platform resource as a function of time for a plurality of tenants of the multi-tenant platform;
    for each of the plurality of tenants, constructing a platform resource usage data record, the data record including a measure of a platform resource usage during each of a plurality of time intervals;
    wherein the platform resource usage data record includes a plurality of numerical values, with each value representing a consumption or use of the resource by a tenant during one of the plurality of time intervals such that the time intervals are one of minutes, hours, days, weeks, or months;
    wherein the measure of the platform resource usage by the tenant over a time interval is located in a separate field of the data record for each time interval;
    selecting a fitness metric for each of a plurality of servers, wherein the fitness metric is a function of the platform resource usage for each tenant assigned to a server;
    combining the platform resource usage data records for each of the plurality of tenants by summing the values representing the consumption or use of the resource in each data field separately to produce a data record representing the combined consumption or use of the resource by all tenants assigned to a server over each of the time intervals, wherein the fitness metric is a function of a norm of the combined data records, and wherein the norm is determined by calculating a square root of a sum of squares of the value in each data field;
    for each of the plurality of servers,
        (a) determining an initial distribution of one or more of the plurality of tenants to one of the plurality of servers;
        (b) based on the fitness metric, determining a first server of the plurality of servers having a value of the fitness metric that indicates that the set of tenants assigned to the first server should be modified;

(c) selecting a tenant currently assigned to the first server;

(d) selecting a second server to which the selected tenant may be moved;

(e) determining the value of the fitness metric for the second server after the selected tenant has been assigned to the second server;

(f) determining if the value of the fitness metric for the second server after the selected tenant has been assigned to the second server is less than the value of the fitness metric for the first server before the selected tenant is assigned to the second server;

(g) if the value of the fitness metric for the second server after the selected tenant has been assigned to the second server is less than the value of the fitness metric for the first server before the selected tenant is assigned to the second server, then assigning the selected tenant to the second server; and (h) repeating steps (a) through (g) for one or more other servers, using the distribution of tenants resulting from assigning the selected tenant to the second server as the initial distribution for step (a).

2. The method of claim 1, wherein the platform resource is one of data storage, computational cycles, use of an extension to an application installed on the platform, or use of a customization feature.

3. The method of claim 1, wherein the initial distribution of one or more of the plurality of tenants to one of the plurality of servers is based on a random distribution of each of the plurality of tenants to one or more of the plurality of servers.

4. The method of claim 1, wherein determining a first server of the plurality of servers having a value of the fitness metric that indicates that the set of tenants assigned to the first server should be modified further comprises determining which of the plurality of servers has the highest value of the fitness metric.

5. The method of claim 1, wherein selecting the tenant currently assigned to the first server further comprises ordering the tenants according to the impact of the tenant on the fitness metric for the server, and selecting the tenant having the largest impact on the fitness metric.

6. The method of claim 1, wherein selecting the second server to which the selected tenant may be moved further comprises determining which of the plurality of servers has the lowest value of the fitness metric, and selecting that server as the second server.

7. The method of claim 1, wherein the norm is a function of one or more weights, wherein the one or more weights are determined by data related to the business operation of a tenant.

8. The method of claim 1, wherein determining the first server is a result of considering a value of the fitness metric and one or more constraints on changing a set of tenants currently assigned to the first server.

9. The method of claim 8, wherein the one or more constraints include constraints related to one or more of a quality of service requirement, a security requirement, or a contractual obligation.

10. The method of claim 1, wherein selecting the second server is a result of considering a value of the fitness metric and one or more constraints on changing a set of tenants currently assigned to the second server.

11. The method of claim 10, wherein the one or more constraints include constraints related to one or more of a quality of service requirement, a security requirement, or a contractual obligation.

12. The method of claim 1, wherein the fitness metric is determined differently for at least two of the plurality of servers.

13. The method of claim 1, wherein the fitness metric for at least one of the plurality of servers is a function of business related data for a tenant or tenants.

14. A method of assigning a new tenant to a server being used to provide the tenant with business data processing services as part of a multi-tenant platform, comprising:

access data regarding a usage of a platform resource as a function of time for a plurality of current tenants of the multi-tenant platform;

for each of the plurality of current tenants, construct a platform resource usage data record, the data record including a measure of a platform resource usage during each of a plurality of time intervals;

wherein the platform resource usage data record includes a plurality of numerical values, with each value representing a consumption or use of a resource by a tenant during one of the plurality of time intervals such that the time intervals are one of minutes, hours, days, weeks, or months;

wherein the measure of the platform resource usage by the tenant over a time interval is located in a separate field of the data record for each time interval;

selecting a fitness metric for each of a plurality of servers, wherein the fitness metric is a function of the platform resource usage for each tenant assigned to a server;

combining the platform resource usage data records for each of the plurality of tenants by summing the values representing the consumption or use of the resource in each data field separately to produce a data record representing the combined consumption or use of the resource by all tenants assigned to a server over each of the time intervals, wherein the fitness metric is a function of a norm of the combined data records, and wherein the norm is determined by calculating a square root of a sum of squares of the value in each data field;

determine one or more tenant characteristics that are correlated with a current tenant's resource usage and a new tenant's resource usage;

determine a current tenant or set of tenants having the one or more tenant characteristics that are the same as those of a new tenant using a K-nearest neighbor (k-NN) regression/classification model;

generate a platform resource usage data record for the new tenant based on the platform resource usage data record for the current tenant or set of tenants;

for each of the plurality of servers, (a) determine an initial distribution of one or more of the plurality of tenants to one of the plurality of servers;

(b) select the new tenant for assignment to a server;

(c) determine the value of the fitness metric for the server after the new tenant has been assigned to the server;

(d) determine if the value of the fitness metric for the server after the new tenant has been assigned to the server is less than the value of the fitness metric for the server before the new tenant is assigned to the server; and (e) if the value of the fitness metric for the server after the new tenant has been assigned to the server is less than the value of the fitness metric for the server before the new tenant is assigned to the server, then assign the new tenant to the server.

15. The method of claim 14, wherein the one or more tenant characteristics that are correlated with a current tenant's resource usage are determined using a machine learning technique.

16. The method of claim 14, wherein the one or more tenant characteristics include one or more of geographic location, business vertical to which the tenant belongs, industry, or number of employees.

17. A non-transitory computer-readable medium that includes stored computer-executable instructions that when executed by a processor of a computer causes the processor to:
   access data regarding a usage of a platform resource as a function of time for a plurality of tenants of the multi-tenant platform;
   for each of the plurality of tenants, construct a platform resource usage data record, the data record including a measure of a platform resource usage during each of a plurality of time intervals;
   wherein the platform resource usage data record includes a plurality of numerical values, with each value representing a consumption or use of the resource by a tenant during one of the plurality of time intervals such that the time intervals are one of minutes, hours, days, weeks, or months;
   wherein the measure of the platform resource usage by a tenant over a time interval is located in a separate field of the data record for each time interval;
   select a fitness metric for each of a plurality of servers, wherein the fitness metric is a function of the platform resource usage for each tenant assigned to a server;
   combine the platform resource usage data records for each of the plurality of tenants by summing the values representing the consumption or use of the resource in each data field separately to produce a data record representing the combined consumption or use of the resource by all tenants assigned to a server over each of the time intervals, wherein the fitness metric is a function of a norm of the combined data records, and wherein the norm is determined by calculating a square root of a sum of squares of the value in each data field;
   for each of the plurality of servers,
   (a) determine an initial distribution of one or more of the plurality of tenants to one of the plurality of servers;
   (b) based on the fitness metric, determine a first server of the plurality of servers having a value of the fitness metric that indicates that the set of tenants assigned to the first server should be modified;
   (c) select a tenant currently assigned to the first server;
   (d) select a second server to which the selected tenant may be moved;
   (e) determine the value of the fitness metric for the second server after the selected tenant has been assigned to the second server;
   (f) determine if the value of the fitness metric for the second server after the selected tenant has been assigned to the second server is less than the value of the fitness metric for the first server before the selected tenant is assigned to the second server;
   (g) if the value of the fitness metric for the second server after the selected tenant has been assigned to the second server is less than the value of the fitness metric for the first server before the selected tenant is assigned to the second server, then assign the selected tenant to the second server; and
   (h) repeat steps (a) through (g) for one or more other servers, using the distribution of tenants resulting from assigning the selected tenant to the second server as the initial distribution for step (a).

* * * * *